(12) United States Patent
Standke et al.

(10) Patent No.: US 8,147,918 B2
(45) Date of Patent: Apr. 3, 2012

(54) WATER-DILUTABLE SOL-GEL COMPOSITION

(75) Inventors: Burkhard Standke, Loerrach (DE); Christian Wassmer, Hausen (DE); Peter Jenkner, Wesel (DE)

(73) Assignee: Evonik Degussa GmbH, Essen (DE)

( * ) Notice: Subject to any disclaimer, the term of this patent is extended or adjusted under 35 U.S.C. 154(b) by 904 days.

(21) Appl. No.: 12/159,785

(22) PCT Filed: Dec. 6, 2006

(86) PCT No.: PCT/EP2006/069397
§ 371 (c)(1), (2), (4) Date: Jul. 1, 2008

(87) PCT Pub. No.: WO2007/085320
PCT Pub. Date: Aug. 2, 2007

(65) Prior Publication Data
US 2009/0022898 A1   Jan. 22, 2009

(30) Foreign Application Priority Data
Jan. 26, 2006  (DE) .......................... 10 2006 003 957

(51) Int. Cl.
*B05D 1/00* (2006.01)
*B05D 3/00* (2006.01)

(52) U.S. Cl. ....... 427/395; 428/447; 106/38.2; 524/588; 528/9; 427/384; 427/394; 427/396; 427/397

(58) Field of Classification Search .................. 428/447; 106/38.2; 524/588; 528/9; 427/384, 394, 427/395, 396, 397
See application file for complete search history.

(56) References Cited

U.S. PATENT DOCUMENTS

| | | | |
|---|---|---|---|
| 4,226,793 A | 10/1980 | Kotzsch et al. | |
| 5,357,024 A | 10/1994 | Leclaire | |
| 5,591,818 A | 1/1997 | Standke et al. | |
| 5,629,400 A | 5/1997 | Standke et al. | |
| 5,679,147 A | 10/1997 | Standke et al. | |
| 5,808,125 A | 9/1998 | Standke et al. | |
| 5,849,942 A | 12/1998 | Standke et al. | |
| 5,863,509 A | 1/1999 | Standke et al. | |
| 5,885,341 A | 3/1999 | Standke et al. | |
| 5,932,757 A | 8/1999 | Standke et al. | |
| 6,051,665 A | 4/2000 | Yamada et al. | |
| 6,054,601 A | 4/2000 | Standke et al. | |
| 6,118,015 A | 9/2000 | Haas et al. | |
| 6,133,466 A | 10/2000 | Edelmann et al. | |
| 6,139,622 A | 10/2000 | Gobel et al. | |
| 6,176,918 B1 | 1/2001 | Glausch et al. | |
| 6,177,582 B1 | 1/2001 | Jenkner et al. | |
| 6,228,936 B1 | 5/2001 | Standke et al. | |
| 6,239,194 B1 | 5/2001 | Standke et al. | |
| 6,251,989 B1 | 6/2001 | Edelmann et al. | |
| 6,255,513 B1 | 7/2001 | Standke et al. | |
| 6,288,256 B1 | 9/2001 | Standke et al. | |
| 6,361,871 B1 | 3/2002 | Jenkner et al. | |
| 6,395,858 B1 | 5/2002 | Mack et al. | |
| 6,403,228 B1 | 6/2002 | Mack et al. | |
| 6,491,838 B1 | 12/2002 | Standke et al. | |
| 6,500,883 B1 | 12/2002 | Mack et al. | |
| 6,534,667 B1 | 3/2003 | Standke et al. | |
| 6,620,514 B1 * | 9/2003 | Arpac et al. | ........... 428/447 |
| 6,641,870 B2 | 11/2003 | Bartkowiak et al. | |
| 6,685,766 B2 | 2/2004 | Standke et al. | |
| 6,695,904 B2 | 2/2004 | Burger et al. | |
| 6,713,186 B1 | 3/2004 | Jenkner et al. | |
| 6,767,982 B2 | 7/2004 | Standke et al. | |
| 6,770,327 B2 | 8/2004 | Edelmann et al. | |
| 6,841,197 B2 | 1/2005 | Standke et al. | |
| 7,578,877 B2 | 8/2009 | Giessler et al. | |
| 7,611,753 B2 | 11/2009 | Bartkowiak et al. | |
| 2008/0003448 A1 | 1/2008 | Standke et al. | |
| 2008/0027161 A1 | 1/2008 | Schlosser et al. | |
| 2008/0058489 A1 | 3/2008 | Edelmann et al. | |
| 2008/0187673 A1 | 8/2008 | Standke et al. | |
| 2008/0188617 A1 | 8/2008 | Standke et al. | |
| 2008/0206572 A1 | 8/2008 | Edelmann et al. | |
| 2008/0210130 A1 | 9/2008 | Giessler-Blank et al. | |
| 2008/0221318 A1 | 9/2008 | Edelmann et al. | |
| 2008/0233341 A1 | 9/2008 | Jenkner et al. | |
| 2009/0011246 A1 | 1/2009 | Giessler-Blank et al. | |
| 2009/0069464 A1 | 3/2009 | Standke | |

FOREIGN PATENT DOCUMENTS

| | | |
|---|---|---|
| EP | 1 375 615 | 1/2004 |
| WO | 2006 010388 | 2/2006 |

OTHER PUBLICATIONS

U.S. Appl. No. 12/673,390, filed Feb. 16, 2010, Wassmer, et al.
U.S. Appl. No. 11/572,555, filed Jan. 23, 2007, Just, et al.
U.S. Appl. No. 12/161,112, filed Jul. 16, 2008, Standke, et al.
U.S. Appl. No. 11/572,688, filed Jan. 25, 2007, Edelmann, et al.
U.S. Appl. No. 11/576,504, filed Apr. 2, 2007, Mueh, et al.
U.S. Appl. No. 12/281,629, filed Sep. 4, 2008, Militz, et al.
U.S. Appl. No. 12/596,725, filed Oct. 20, 2009, Giessler-Blank, et al.

* cited by examiner

*Primary Examiner* — Gregory Delcotto
(74) *Attorney, Agent, or Firm* — Oblon, Spivak, McClelland, Maier & Neustadt, L.L.P.

(57) ABSTRACT

The present invention provides a sol-gel composition which is dilutable with water in any proportion and is based on the reaction of at least the following components: (i) a glycidyloxypropylalkoxysilane, (ii) an aqueous silica sol having a solids content of >1% by weight, (iii) an organic acid as hydrolysis catalyst, and (iv) n-propyl zirconate, butyl titanate or titanium acetylacetonate as crosslinker, starting from a mass ratio of the solids mass of component (ii) to component (i) 0.75, a process for preparing it and its use, in particular as a sol-gel composition for corrosion control coatings, a corresponding corrosion control coat or primer coat, and articles equipped with such a coating.

32 Claims, No Drawings

WATER-DILUTABLE SOL-GEL COMPOSITION

The present invention relates to a special aqueous composition based on silane and silica sol by the sol-gel process, to its preparation and to its use.

Silanes are receiving increasing interest as starting materials in the production of nanocomposites by the sol-gel process, including EP 1 288 245 A, EP 0 982 348 A, DE 198 16 136 A, WO 99/036359. Nanocomposites of this kind are commonly used as coating materials for any of a very wide variety of applications.

A frequent and major disadvantage of known coating systems based on sol-gel formulations is the presence of chloride and a high fraction of organic, generally volatile and also toxic solvents, which are obtained as a by-product of the hydrolysis of the silanes or are added as diluents. The use of an amount of water insufficient for full hydrolysis of the silanes, and the utilization of acidic hydrolysis catalysts, allows sol-gel systems to be produced which are stable on storage for months, but contain solvent. It is also known that increasing the amount of water leads to full hydrolysis of the alkoxy groups and hence a drastic reduction in the storage stability of the systems, and/or to rapid formation of gel after the end of the hydrolysis process, particularly when such systems are intended to have a very high solids content.

The as yet unpublished German patent application 10 2004 037 045.1 relates essentially to high solids content aqueous silane nanocomposites. Unfortunately, however, the water dilutability of such sol-gel systems is limited. Systems highly diluted with water exhibit instances of precipitation and sedimentation during storage, particularly at slightly elevated storage temperature. For applying thin coats in particular it is necessary with certain application methods, such as spraying or dipping, to apply the sol-gel system in dilute solution.

It was an object of the present invention to provide a further reactive, substantially aqueous sol-gel system which in particular is regularly dilutable with water and stable on storage.

This object is achieved in accordance with the invention as specified in the claims.

Particularly with a high ratio of component (ii) to (i), for example r=0.96, the water dilutability of said sol-gel coating material is generally restricted, and in that case the dilute solutions are also of low stability on storage. In order to attain low dry coat thicknesses <10 µm, it is necessary for certain forms of application, such as dipping or spraying, for example, to achieve a sharp reduction in the dry residue by means of solvents. If in this case water is to be used rather than organic solvents, it has surprisingly emerged that highly water-dilutable and at the same time storage-stable sol-gel coating compositions can be prepared if, starting from a sol-gel system comparable to that of DE application 10 2004 037 045.1, a relatively low mass ratio of component (ii) to component (i) is set: r=solids mass of component (ii)/mass of component (i). With a ratio r≦0.75, water-dilutable sol-gel coating materials which are storage-stable in dilution are made advantageously possible.

Thus, surprisingly, it has been found that a substantially aqueous hydrolysate which is particularly reactive for coating purposes, and which is of virtually infinite dilutability with water and in the diluted state is also stable on storage for more than four months, is obtainable simply and economically by mixing at least (i) a glycidyloxypropylalkoxysilane, (ii) a colloidally disperse, aqueous silica sol having a solids content of >1% by weight, preferably >20% by weight, (iii) an organic acid as hydrolysis catalyst, especially acetic acid, propionic acid or maleic acid, and (iv) zirconium tetrapropylate [also called n-propyl zirconate: $Zr(O-C_3H_7)_4$], butyl titanate, especially n-butyl titanate [$Ti(O-C_4H_9)_4$] or titanium acetylacetonate as crosslinker, the mass ratio of the solids mass of component (ii) to component (i) being ≦0.75, i.e. r=solids mass (ii)/mass (i) with r≦0.75. Moreover, advantageously, particularly in the case of methanol, which is toxic, the hydrolysis alcohol can be removed essentially, i.e. <5% by weight down to residual amounts in the region of the detection limit, from the hydrolysate, and, when necessary, can be replaced quantitatively by water.

The present hydrolysates and also hydrolysates additionally diluted with water (referred to below as sol-gel system or sol-gel composition or, for short, composition, coating material or material), are further notable for a comparatively outstanding storage stability, i.e. of more than four months.

Furthermore, the present compositions are environmentally friendly, being substantially free from chloride, i.e. containing preferably less than 0.8% by weight, in particular less than 0.5% by weight, of chloride, based on the composition, and having only a comparatively low fraction of volatile organic constituents (VOC fraction), of fire hazard substances, and even of toxic substances at all. Thus compositions of the invention generally also have a relatively high flash point, preferably of around ≧90° C.

In particular, coatings on metal, obtained with a coating material of the invention, exhibit excellent corrosion control properties.

Moreover, coatings based on the present coating materials prove to be effective barrier layers, particularly with respect to water and oxygen.

Coating materials of the invention are likewise notable for outstanding primer properties; that is, they can also be used with advantage as adhesion promoters, particularly in the form of very thin coats.

Moreover, coatings obtainable after application of one of the present compositions are notable for outstanding resistance to water and for excellent hardness and scratch resistance.

The present invention accordingly provides a water-dilutable sol-gel composition based on the reaction of at least the following components:
(i) a glycidyloxypropylalkoxysilane,
(ii) an aqueous silica sol having a solids content of >1% by weight,
(iii) an organic acid as hydrolysis catalyst, and
(iv) n-propyl zirconate, butyl titanate or titanium acetylacetonate as crosslinker,
starting from a mass ratio of the solids mass of component (ii) to component (i) ≦0.75. Preference is given here to a mass ratio of the solids mass of component (ii) to component (i) of 0.1 to 0.7, more preferably of 0.2 to 0.6, in particular of 0.3 to 0.5, and also all numbers situated numerically in between.

Component (i) is preferably selected from the series 3-glycidyloxypropyltrimethoxysilane, 3-glycidyloxypropyltriethoxysilane, 3-glycidyloxypropylmethyldimethoxysilane, 3-glycidyloxypropylmethyldiethoxysilane or a mixture of at least two of the aforementioned silanes.

Preference is given as component (ii) to a usually cationic, colloidally disperse silica sol having a solids content of >1% to ≦50% by weight, with very particular preference of 30% to <50% by weight, in particular of 40 to <50% by weight, i.e. around 45% by weight, the solids content being determined generally in accordance with DIN EN ISO 3251. Preferred aqueous silica sols have in particular a pH of 3 to 5, in particular of 3.5 to 4. It is also possible, however, to use alkalinically or neutrally stabilized silica sol. The particle size distribution can be determined in conventional manner by means of laser diffraction (Coulter LS particle size measuring instrument). Furthermore, silica sols used in accordance with the invention may contain not only amorphous, aqueous $SiO_2$ particles but also further sol-gel-forming, aqueous element oxides, such as aluminium oxides or silicon/aluminium oxides or titanium oxides or zirconium oxides or zinc oxide or mixtures of at least two of the aforementioned oxides. Furthermore, preferred silica sols generally contain amorphous, aqueous oxide particles having an average size of 40 to 400 nm, examples—but not exclusively—being Levasil® 200S/30% and Levasil® 100S/45%.

The pH can be determined in conventional manner, by means for example of pH paper, pH sticks and pH electrodes.

Preference is given, furthermore, to an organic acid from the series acetic acid, propionic acid and maleic acid as component (iii). Thus a composition of the invention contains preferably 0.01% to 3% by weight of component (iii), more preferably 0.5% to 2% by weight, in particular 1% to 2% by weight, based on the composition.

The crosslinker of component (iv) can be used as a powder, as a liquid or in alcoholic solution for preparing the composition of the invention. Compositions of the invention are preferably based on a component (iv) content of 0.5% to 8% by weight.

For compositions of the invention it is also possible to use, as a further component (v), a tetraalkoxysilane, especially tetraethoxysilane, at least one alkylsilane, suitably an alkylalkoxysilane, in particular dimethyldiethoxysilane or methyltrimethoxysilane, and/or at least one phenyltrialkoxysilane, especially phenyltriethoxysilane or phenyltrimethoxysilane, with advantage.

Thus a composition of the invention may contain component (v) in an amount of 1% to 10% by weight, based on the composition. Appropriately in this case a fraction of component (ii) is replaced correspondingly by component (v).

Furthermore, the performance of the sol-gel coating may be improved further by selection of further specific additives or components (vi). Particularly suitable further additives or components (vi) in the coating material include phosphoric acid, phosphates, such as alkali metal phosphates, for example $NaH_2PO_4$, $Na_2HPO_4$, $Na_3PO_4$, or corresponding cation salts, polyacids and/or heteropolyacids and their salts, such as chromic acid, molybdic acid, chromates, examples being alkali metal and alkaline earth metal chromates and dichromates, calcium molybdate, molybdophosphoric acid, to name but a few, aqueous dispersions of organic binders, especially aqueous acrylate dispersions, such as methyl methacrylate/n-butyl acrylate dispersions, for example Plextol® D510, nanoparticles, preferably inorganic nanoparticles, more preferably pyrogenically produced nanoparticles, especially fumed silica, i.e. pyrogenically prepared silica (Aerosil®), and also aminosilanes and aminoalkylsiloxanes, as also listed in more detail below.

Thus as further component(s) (vi) for said compositions it is possible to use additives which further improve the flow properties and the corrosion control properties. Suitable additives (vi) are flow control assistants and wetting additives of the kind typically used in the paints and coatings industry, and also phosphoric acid or salts thereof in a concentration of 0.001% to 1% by weight, preferably 0.01% to 0.1% by weight, more preferably 0.03% to 0.06% by weight, or aqueous resin dispersions, especially acrylate dispersions, more preferably aqueous methyl methacrylate/n-butyl acrylate dispersions, in a concentration of preferably 0.1% to 50% by weight, more preferably 1% to 40% by weight, very preferably 10% to 30% by weight, or nanoparticles, preferably produced pyrogenically, especially pyrogenic silica, in a concentration of 0.01% to 20% by weight, preferably 1% to 10% by weight, based in each case on the coating material.

Furthermore, the stability of a present coating material, possibly highly diluted, may be additionally improved further by adjusting the pH to 6 to 9, preferably 7 to 8. Thus, for example—but not exclusively—the pH can be adjusted by means of well-metered additions of water-soluble basic substances. Suitable examples thereof include ammonia, organic amines and, with particular advantage, from the series of additives according to (vi), aminosilanes, such as

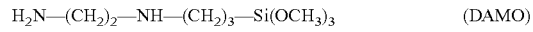

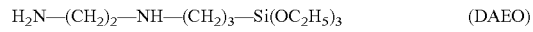

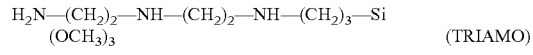

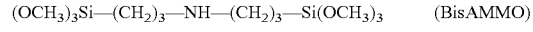

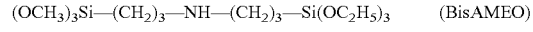

or aqueous solutions of the respective aforementioned aminoalkylsilanes, examples being Dynasylan® 1122 or Dynasylan® 1124, or so-called aminosiloxanes, especially aqueous aminosiloxane solutions, such as Dynasylan® 1151, or Hydrosils based on at least one of the aforementioned aminoalkylsilanes, of the kind described in more detail later on below, i.e., in particular, aqueous solutions—which have been made basic—of the cocondensates of aminoalkoxysilanes and other organofunctional alkoxysilanes.

Compositions of the invention, i.e. including correspondingly water-diluted sol-gel systems, are generally slightly turbid to opalescent fluids and are distinguished surprisingly by sol particles having an average diameter of 40 to 200 nm, preferably of 50 to 100 nm. The diameter of the sol particles can be determined in conventional manner by means for example of laser diffraction. It is particularly surprising in this context that compositions of the invention, advantageously, also possess, over a storage time of around four months or more, a virtually unchanged particle size distribution, i.e. are stable on storage.

Moreover, compositions of the invention are notable advantageously for a solids content of >0.5% to <60% by weight, preferably 5% to 55% by weight, more preferably 10% to 50% by weight, very preferably 20% to 40% by weight, in particular 25% to <35% by weight, based on the total composition. The solids content of present compositions is appropriately determined in accordance with DIN ISO 3251.

In addition it is possible to set the solids content and the viscosity of present compositions by adding water. Advantageously in this context the amount of water added is such as to give a solids content of 0.5% to 60% by weight. Compositions of the invention of this kind are generally and advantageously stable on storage for several months.

Furthermore, compositions of the invention are notable for a comparatively low hydrolysis alcohol content of <5% by weight, preferably <3% by weight, more preferably <1% by weight, based on the total composition. The alcohol content of a composition of the invention can be determined in conventional manner by means of gas chromatography, for example.

The storage stability can be additionally prolonged if besides water a particularly suitable organic solvent is added, e.g. ≦10% by weight of 1-methoxypropan-2-ol.

Thus compositions of the invention may advantageously have a 1-methoxypropan-2-ol content of ≦10% by weight, preferably 5% to 10% by weight, based on the total composition. Systems of this kind are generally also notable for a high flash point.

Aqueous compositions of the invention have, as a mathematical parameter, a water content of preferably around 99.5% to 30% by weight, more preferably of 90% to 40% by weight, very preferably of 80% to 50% by weight, and in particular of >70% by weight, based on the total composition.

In the case of a fraction of around >50% water as solvent a determination is made for such coating compositions in general of the amount of "nonvolatile components". This determination is made typically by evaporating the water and alcohol in accordance with DIN EN ISO 3251—"Determination of the amount of nonvolatile components". For this purpose the material is generally conditioned at 125° C. for 1 hour in a disposable aluminium dish and the nonvolatiles content is determined by differential weighing. The determination method is employed predominantly for coating materials, binders for coating materials, polymer dispersions, condensation resins, polymer dispersions with fillers, pigments, etc. This method yields relative values.

Thus for compositions of the invention a particularly preferred nonvolatiles content is from 0.5% to 50% by weight. Particular preference is given here to systems with 5% to <30% by weight of nonvolatile components.

Compositions of the invention may further comprise at least one surfactant. In particular it is possible in this way, through the addition of a silicone surfactant, for example BYK-348 (polyether-modified polydimethylsiloxane), to achieve an additional improvement in the substrate wetting, which can make an advantageous contribution to avoiding flow problems in association with the production of coatings, particularly on metallic substrates. Preference is given in general to a surfactant content of <0.5% by weight, in particular of 0.1% to 0.3% by weight, based on the composition.

It is also possible to add what are called Hydrosil systems to compositions of the invention.

By Hydrosil systems are meant here essentially water-based, chloride-free, predominantly slightly acidic but also neutral and basic aqueous systems which contain a mixture of water-soluble, almost completely hydrolysed (fluoro)alkyl-/aminoalkyl-/hydroxy- (and/or alkoxy-) siloxanes, as may be seen from, for example, EP 0 716 127 A, EP 0 716 128 A, EP 0 846 717 A and EP 1 101 787 A. Examples include Dynasylan® HS 2909, Dynasylan® HS 2775, Dynasylan® HS 2776 and Dynasylan® HS 2627. Particularly advantageous is the addition of Dynasylan® F 8815 to a present composition in a weight ratio of 1:0.01 to 0.01:1, more preferably of around 1:0.1 to 0.1:1, the aqueous Dynasylan® F 8815 used here having an active substance content of preferably <80% by weight, more preferably <40% by weight, very preferably of 0.1% to 20% by weight, in particular of around 13% to 15% by weight, based on the composition and determined in accordance with DIN EN ISO 3251, as described above. Resulting compositions of the invention are advantageously notable on application for highly hydrophobic and oleophobic properties (also referred to as "easy to clean") on the part of the coating.

A sol-gel composition of the invention, especially a water-diluted system, has a pH of preferably 6 to 9, in particular of 7 to 8.

Likewise provided with the present invention is a process for preparing a sol-gel composition of the invention by initially introducing component (i), subsequently metering in component (iii) with effective commixing, then adding component (iv), thereafter adding component (ii), and causing reaction to take place, the reaction being carried out if desired with the addition of at least one diluent, and starting from a mass ratio of the solids mass of component (ii) to component (i) ≦0.75.

Diluents which can be used in the present process include water, methanol, ethanol and/or 1-methoxypropan-2-ol and also further alcohols, such as propanol or isopropanol, for example.

When using one or more component(s) (v) it or they is or are introduced initially preferably together with component (i) in the process of the invention.

In the process of the invention the reaction is carried out preferably at a temperature of 0 to 35° C., more preferably at 5 to 25° C., for a period of 1 to 60 minutes, more preferably over 5 to 20 minutes, and the resulting product mixture is allowed to afterreact appropriately at a temperature of around 35 to 85° C., preferably at 50 to 60 or 60 to 70° C., i.e. preferably somewhat below the boiling point of the hydrolysis alcohol, for 10 minutes to 4 hours, more preferably for 30 minutes to 3 hours. Reaction and afterreaction are generally carried out with effective commixing, such as with stirring, for example.

Subsequently it is possible to remove the hydrolysis alcohol formed in the reaction, particularly methanol, ethanol and/or n-propanol, from the resulting product mixture system by distillation under reduced pressure, and, if desired, to replace the amount of alcohol removed by a corresponding amount of water.

An additional possibility is to add a surfactant to the reaction mixture or to the product mixture, for example—but not exclusively—BYK 348.

An alternative option is to dilute the resulting product mixture, which is generally slightly turbid to opalescent, and/or to set the desired solids content, where possible, using water and/or 1-methoxypropan-2-ol or other alcohols.

In the process of the invention it is preferred to add component(s) (vi) to the product mixture.

The present product mixture or present composition can additionally be admixed with a Hydrosil, preferably one containing a fluorofunctional active substance. It is added in particular as a Hydrosil concentrate in an amount of 13% to 15% by weight, calculated as active substance and based on the later composition, with effective commixing. Compositions obtained in this way are advantageously notable following application for a hard, scratch-resistant coating, and additionally a coating of this kind, in wetting experiments with water, has a contact angle of >105°.

The present invention accordingly further provides sol-gel compositions which are obtainable by the process of the invention.

Generally speaking, compositions of the invention can be prepared as follows:

In general, component (i) is introduced initially, (iii) is metered first into it, then (iv) is metered in, and subsequently (ii) is added; the ratio of components (ii) to (i) is set, and as further components use is made if desired of component(s) (v), if desired, component(s) (vi) and, if desired, a diluent. In addition, effective commixing ought to be ensured.

As a result of the fraction of silica sol it is possible to introduce substantially more water into the mixture than is necessary for the hydrolysis of the silane of (i) and also, if desired, (v). As hydrolysis sets in, there is generally a slight increase in the temperature of the reaction mixture. In this case it is possible to carry out additional cooling or, where necessary, gentle heating. Appropriately the reaction mixture or product mixture is allowed to afterreact for a certain time at slightly higher temperature with stirring. Following the reaction, therefore, the product is a hydrolysate with, in general, a copious amount of water and also hydrolysis alcohol, such as methanol, ethanol or n-propanol, for example.

A further possibility is to remove the hydrolysis alcohol, especially methanol, which is toxic, from the resulting product mixture by distillation and to replace it by corresponding amounts of water.

The hydrolysate has outstanding storage stability and advantageously can also be diluted almost ad infinitum by further addition of water. Hydrolysis is accompanied by the start of slow condensation of the silane molecules with one another, but also with OH groups on the surface of the $SiO_2$ particles, which leads to the preliminary formation of an organic/inorganic network, but is generally not accompanied by any deposition of reaction product. In spite of this, sol-gel compositions of the invention are surprisingly stable on storage even in the water-diluted state.

It is also possible with advantage to admix further components to the present composition, examples being a surfactant, further amounts of water, 1-methoxypropan-2-ol, and a Hydrosil mixture, to name but a few examples.

In this way, advantageously, dilutable, storage-stable, slightly turbid, opalescent, highly mobile fluids are obtained. Moreover, on the basis of their rheological properties, compositions of the invention in general are particularly user-friendly and dilutable with water in virtually any proportion, with even such water-diluted sol-gel systems possessing excellent storage stability.

Compositions of the invention are generally employed by application to a substrate, by brushing, squirting, spraying, knife coating or dipping, for example, to name but a few possibilities. Prior to coating it is possible to clean or, in particular, degrease the surface to be protected, especially a metal surface, by methods which are common in the coatings industry. Cleaning may take place for example—but not exclusively—by chemical, mechanical or thermal means. Typically, following the application of the sol-gel coating material, the coating is subjected to brief initial drying and can then be subjected to thermal aftertreatment, i.e. curing. Thus, after the coating operations, it is preferred to carry out thermal treatment at a temperature >150° C. In this context compositions of the invention are also notable for excellent performance properties.

Thus a sol-gel coat can be produced using a composition of the invention, in particular a water-dilutable composition, as a corrosion control coat or primer coat, in a variety of ways, in particular on a metal substrate. Suitable techniques in this context include, generally, all techniques that are suitable for liquid coating materials in the coating sector, such as spraying, brushing, rolling, dipping and knife coating. Preference is given to aiming for dry coat thicknesses of 0.1 to 10 µm, with particular preference being given to dry coat thicknesses of 1 µm and below. The sol-gel coat generally dries in air to form coatings which are firm to the touch. Aftercrosslinking may take place at elevated temperature. It is preferred first to dry the sol-gel coat, applied to a metal surface, at room temperature for a few minutes, preferably 0.5 to 100 minutes, more preferably 1 to 20 minutes, in particular 5 to 10 minutes, before carrying out, advantageously, a completion cure, preferably at 100 to 400° C., more preferably at 150 to 250° C., very preferably at 180 to 220° C. The time for the completion cure may vary between a few seconds, days and weeks depending on temperature, and is preferably from 0.5 to 60 minutes, more preferably from 0.5 to 20 minutes. Curing under forced-air conditions has proved to be particularly appropriate, for example—but not exclusively—in a forced-air drying oven, at a temperature of 200 to 220° C. within a period of 5 to 20 minutes.

The mechanical properties of the coating and the water resistance of the coating are brought about advantageously through the addition of n-propyl zirconate, n-butyl titanate or titanium acetylacetonate as crosslinker.

Furthermore, by an appropriate addition of dimethyldiethoxysilane, it is possible to improve the hydrophobic effect and the elasticity of the coating. By adding phenylalkoxysilane when preparing the coating material of the invention it is possible to exert an advantageous influence on both the thermal stability and the elasticity of such a coating. The addition of methyltriethoxysilane has the advantageous effect of improving the hydrophobic properties of the coating. Furthermore, the scratch resistance and abrasion resistance can be further improved in particular by adding tetraethoxysilane when preparing the coating material.

The formation of fly rust on acid-sensitive substrates, such as steel, can be largely prevented if the pH is set at 7 or slightly above. For this purpose it is possible to add basic additives to the sol-gel system. Suitability is possessed in principle by all water-soluble bases but particularly by basic amines, very particular suitability being possessed by basic aminosilanes and also basic aminosilane hydrolysates, such as Dynasylan® 1151 (Degussa), for example.

The present invention likewise provides for the use of a sol-gel composition of the invention for coating substrate surfaces, the composition being applied to the substrate and cured thermally.

For instance, after the application of the composition of the invention to the substrate, the coating can be flashed off or initially dried suitably for 0.5 to 100 minutes and subsequently the coating can be cured advantageously at a temperature in the range from 60 to 400° C.

For example—but not exclusively—the curing can be carried out under the following conditions: preheat drying unit, then for 30 to 60 minutes at 150° C. or 10 to 30 minutes at 180° C. or around 20 minutes at 200° C. or about 10 to 20 minutes at 220° C.

In this case it is possible to achieve coat thicknesses of <1 to 15 µm, preferably 0.1 to 10 µm, more preferably 0.2 to 5 µm. Particularly suitable, with particular advantage, are coats of the invention as a corrosion control coat on metal surfaces or a primer coat with a coat thickness of 0.1 to around 1 µm.

The present invention further provides coatings obtainable when inventively using the present compositions.

Coatings of the invention and articles or substrates thus coated are additionally notable with particular advantage for outstanding abrasion resistance and scratch resistance, good weather resistance, in particular with respect to UV radiation and rain.

Thus sol-gel systems of the invention are also suitable in particular for producing mechanically stable, scratch-resistant and abrasion-resistant, highly hydrophobic, adhesion-promoting and chemical-resistant coatings with excellent corrosion control effect on metallic surfaces.

For instance, coatings of the invention are produced preferably—but not exclusively—on paper, for producing veneer for example, on cardboard, wood, solid wood for example, chipboard, on plastics, such as melamine, on coatings, on stone, ceramic, but in particular on metal and/or metal alloys, such as aluminium, aluminium alloys, steel, galvanized steel, stainless steel, for example on metal sheets or shaped parts, particularly in the automotive industry as an intermediate coat or as a topcoat or as a sole corrosion control coat on a metal surface or as a primer coat, to name but a few examples. Coatings of the invention are notable especially as direct application on a metal surface.

Likewise provided by the present invention, therefore, are articles having a coating of the invention.

The present invention is illustrated by the examples which follow, without the subject matter of the invention being restricted.

EXAMPLES

Determination of Solids Content:

In accordance with DIN ISO 3251 the solids content of liquids or coating materials is understood to mean the amount of nonvolatile components, the determination being carried out under well-defined conditions.

The solids content of the present coating compositions or liquid ingredients was determined as follows in a method based on DIN ISO 3251 (QM-AA AS-FA-SL 7001):

A disposable aluminium dish (d=about 65 mm, h=about 17 mm) was charged with approximately 1 g of sample (accuracy 1 mg) on an analytical balance. The dish was swirled briefly to distribute the product evenly within it. The dish was stored in a drying oven at about 125° C. for 1 hour. After the end of the drying procedure the dish was cooled to room temperature for 20 minutes in a desiccator and back-weighed on the analytical balance to an accuracy of 1 mg. For each experiment it was necessary to carry out at least two determinations and to report the average value.

Assessment of Corrosion Properties by a Method Based on DIN 50021 (CASS Test):

The coated metal substrates are placed in the test solution at 50° C. for 24 hours. The metal substrates are completely covered with the corrosive liquid. Thereafter the test substrates are removed from the test solution and the corrosion is assessed visually:

Assessment Criteria:

+: only isolated traces or no traces of corrosion visible o: distinct corrosion (pitting) apparent −: very severe corrosion (pitting) apparent The test solution is prepared in accordance with DIN 50021 (cf. DIN 50021, page 3, section 5.3, Test solution for DIN 50021—CASS test).

Measurement of Dry Coat Thickness:

Test Apparatus:

Dualscope MP4C from Fischer

Dualscope MP40 from Fischer

Testing:

For measurement of a cured coating, the probe is placed on the paint film and the measurement is read off in μm. Depending on the size of the coated area, a plurality of measurements should be determined (3 to 10). As a measure of the scatter it is possible to use the difference between the largest and the smallest value, or the standard deviation. The number of measurements can be read off.

Calibration:

Prior to each series of measurements, the instrument is investigated by means of standardization (zero-point determination) on the uncoated article under measurement, with subsequent measurement of a test sheet. If the deviation in the coat thickness measured is >1 μm, a corrective calibration is carried out with a certificated test leaflet.

Example 1

Production of Sol-Gel System 1

Apparatus:

Stirred reactor with distillation apparatus, vacuum pump
Metering apparatus, liquid-phase and overhead thermometers Procedure:

415.6 g of Dynasylan® GLYMO were introduced as an initial charge and 20.6 g of acetic acid were added with stirring. Immediately thereafter 41.1 g of TYZOR® NPZ were metered in. After 5 minutes the temperature had risen by about 2 to 5° C. At that point 417.0 g of Levasil® 100S/45% (aqueous silica sol with a solids content of 45% by weight) were stirred in over the course of 1 minute. A good stirring action was ensured. Immediately thereafter 477.3 g of DI water were added dropwise, again rapidly. When the maximum temperature (about 42° C.) was reached the opaque dispersion was stirred further at 75 to 80° C. (reflux) for 2 hours. After the dispersion had cooled to a liquid-phase temperature of about 50° C., a further 356.4 g of DI water were metered in. Subsequently the methanol was distilled off at a liquid-phase temperature of about 50 to 60° C. and an absolute pressure of about 270 mbar. At the end of the distillation the liquid-phase temperature rose to 60 to 65° C. with unchanged pressure. The overhead temperature likewise rose to >62° C. At that point only water was distilled off, and the distillation was therefore ended. After the dispersion had cooled to ≦50° C., the amount of DI water removed by distillation, which was >59.4 g, was replenished. The dispersion was stirred further for at least 2 hours. It was discharged at RT.

The product had a milkily opaque appearance.

The ratio r=solids mass of component (ii)/mass of component (i) was 0.45.

Final Mass:

Yield virtually 100%: 1498 g

The physicochemical properties of the product were as follows:

| | | |
|---|---|---|
| Solids content (1 h, 125° C.) | 36% by weight | (based on DIN ISO 3251) |
| SiO$_2$ content | about 16% by weight | (AN-SAA-1653) |
| pH | 4 to 5 | |
| Density (20° C.) | 1.148 g/ml | (DIN 51757) |
| Viscosity (20° C.) | about 8 mPa s | (DIN 53015) |
| Methanol after hydrolysis | <3% | (AN-SAA 0272) |

Comparative Example 1a

Production of Sol-Gel System 1a

Apparatus:

Stirred reactor with distillation apparatus

Metering apparatus

Internal thermometers

Procedure:

363.6 g of Dynasylan® GLYMO were introduced as an initial charge and 18.0 g of acetic acid were added with stirring. Immediately thereafter 36.0 g of TYZOR® NPZ were metered in. After 5 minutes the temperature had risen by about 2 to 5° C. At that point 782.4 g of Levasil® 100S/45% were stirred in over the course of 3 minutes. A good stirring action was ensured. When the maximum temperature (10 minutes after the end of the addition of silica sol) was reached the opaque dispersion was stirred further at 75 to 80° C. (reflux) for 2 hours. After the dispersion had cooled to a liquid-phase temperature of about 50° C., 312.0 g of DI water were metered in. Subsequently the methanol was distilled off at a liquid-phase temperature of about 50 to 60° C. and an absolute pressure of about 270 mbar. At the end of the distillation the liquid-phase temperature rose to 63 to 65° C. with unchanged pressure. The overhead temperature likewise rose to >62° C. At that point only water was distilled off, and the distillation was therefore ended. After the dispersion had cooled to ≦50° C., the amount of water removed by distillation was replenished. The dispersion was stirred further for approximately 2 hours.

The product had a milkily opaque appearance.

The ratio r=solids mass of component (ii)/mass of component (i) was 0.96.

Final Mass:

Yield virtually 100%: 1364 g

Analyses:

| Determination | Result | Method |
| --- | --- | --- |
| Viscosity | <100 mPa s | DIN 53015 |
| Density | 1.24-1.25 g/ml | DIN 51757 |
| Solids | 46%-49% | Based on DIN ISO 3251 |
| pH | 4.7-5.0 | |
| $SiO_2$ | 27%-30% | AN-SAA 1653 |
| Methanol after hydrolysis | <3% | AN-SAA 0272 |

Example 2

Water Dilutability of Sol-Gel Systems from Example 1 and Comparative Example 1a

The products from Example 1 and from Comparative Example 1a were diluted 1:1 with DI water and stored at 50° C. After a few days of storage a distinct sediment became apparent in the case of the product from Comparative Example 1a, but did not occur with the product from Example 1.

Summary: only the product from Example 1 is stable on storage in dilution with water.

Storage-stable water-diluted products are important for the practical applications of spraying and dipping if low dry coat thicknesses of 1 μm and below are to be achieved.

Example 3

Production of a Neutralized Sol-Gel System

The product from Example 1 was charged to a stirred vessel and admixed with thorough stirring and continual pH monitoring with Dynasylan® 1151 (an aqueous aminosilane hydrolysate from Degussa). Dynasylan® 1151 was metered in until a pH of 7 had been reached in the composition. The resulting product was stable on storage at room temperature for more than four months. Within the storage time there was a change in pH. At the end of the storage time it was 6.

Example 4

Storage Stability

The products from Example 1 and from Comparative Example 1a were stored in a drying oven in sealed glass bottles at 50° C. for a prolonged time. The product from Comparative Example 1a underwent gelling after a storage time of less than 100 days, while the product from Example 1 was still liquid even after 180 days of storage at 50° C. This shows that the storage stability of the products of the invention even in the undiluted state is markedly better than that of the sol-gel system from Comparative Example 1a.

The invention claimed is:

1. A water-dilutable sol-gel composition based on the reaction of at least the following components:
   (i) a glycidyloxypropylalkoxysilane,
   (ii) an aqueous silica sol having a solids content of >1% by weight,
   (iii) an organic acid as hydrolysis catalyst, and
   (iv) n-propyl zirconate as crosslinker,
   starting from a mass ratio of the solids mass of component (ii) to component (i) of 0.30 to 0.50.

2. The composition according to claim 1, wherein component (i) is selected from the group consisting of 3-glycidyloxypropyltrimethoxysilane, 3-glycidyloxypropyltriethoxysilane, 3-glycidyloxypropylmethyldimethoxysilane, 3-glycidyloxypropylmethyldiethoxysilane and mixtures thereof.

3. The composition according to claim 1, wherein colloidally disperse silica sol having a solids content of >20% to 50% by weight is component (ii).

4. The composition according to claim 1, wherein said organic acid is selected the group consisting of acetic acid, propionic acid and maleic acid.

5. The composition according to claim 1, wherein a content of component (iv) is 0.5% to 8% by weight, based on the composition.

6. The composition according to claim 1, which is further based on at least one tetraalkoxysilane, at least one alkylsilane or at least one phenyltrialkoxysilane as component (v).

7. The composition according to claim 1, having a pH of 6 to 9.

8. The composition according to claim 1, which is further based on at least one component (vi) selected from the group consisting of phosphoric acid, phosphates, polyacids, heteropolyacids, salts of polyacids, salts of heteropolyacids, flow control assistants, wetting agents, surfactants, aqueous dispersions of organic binders, nanoparticles, aminoalkylsilanes, aminoalkylsiloxanes, aqueous solutions of aminoalkylsilanes and aqueous solutions of aminoalkylsiloxanes.

9. The composition according to claim 1, wherein said sol particles have an average diameter of 40 to 200 nm.

10. The composition according to claim 1, having a solids content of >0.5% to <60% by weight, based on the total composition.

11. The composition according to claim 1, having a hydrolysis alcohol content of <5% by weight, based on the total composition.

12. The composition according to claim 1, having a 1 methoxypropan-2 ol content of ≦10% by weight, based on the total composition.

13. The composition according to claim 1, having a water content of around 99.5% to 30% by weight, based on the total composition.

14. The composition according to claim 1, further comprising at least one surfactant.

15. The composition according to claim 1, which is further based on a hydrophobicizing or oleophobicizing hydrosil system in a weight ratio of the hydrophobicizing or oleophobicizing hydrosil system to the composition of 1:0.01 to 0.01:1, the hydrosil system employed comprising <80% by weight of said siloxanes as active substance.

16. A process for preparing a sol-gel composition according to claim 1, comprising:
   initially introducing component (i),
   subsequently metering in component (iii) with effective commixing,
   then adding component (iv), thereafter adding component (ii), and causing reaction to take place, the reaction being carried out with the addition of at least one diluent, and starting from a mass ratio of the solids mass of component (ii) to component (i) of 0.30 to 0.50.

17. The process according to claim 16, wherein water, methanol, ethanol or 1 methoxy-propan-2 of is used as diluent.

18. The process according to claim 16, further comprising adding one or more components (v) which are introduced initially together with component (i).

19. The process according to claim 16, wherein the reaction is carried out at a temperature of 0 to 35° C. for a period of 1 to 60 minutes and the product mixture is allowed to afterreact at a temperature of 35 to 85° C. for 10 minutes to 4 hours.

20. The process according to claim 16, wherein a hydrolysis alcohol formed in the reaction, methanol, ethanol and/or n-propanol are/is removed from the system and, optionally, the amount of alcohol removed is replaced by a corresponding amount of water.

21. The process according to claim 16, further comprising adding at least one component (vi) to the product mixture.

22. The process according to claim 16, wherein the pH of the reaction mixture or product mixture is adjusted to a value of 6 to 9.

23. The process according to claim 16, wherein the product mixture is diluted with water.

24. A sol-gel composition obtainable according to claim 16.

25. A method of coating a substrate surface, comprising:
coating said surface with a sol-gel composition according to claim 1.

26. The method according to claim 25, comprising applying the sol-gel composition to the substrate, to obtain a coated substrate, and
subjecting said coated substrate to thermal curing.

27. The method according to claim 25, wherein said substrate is selected from the group consisting of, paper, cardboard, wood, chipboard, plastic, coating films, stone, ceramic, metal and metal alloys.

28. The method according to claim 25, wherein said substrate is selected from the group consisting of a metal or a metal alloy, and the coating on said substrate is a corrosion control coating.

29. The method according to claim 25, wherein said coating is an adhesion-promoting coating.

30. A coating obtainable by the method according to claim 25.

31. The method according to claim 25, wherein said coating has a thickness of 0.1 to 10 μm.

32. An article, comprising: a coating according to claim 30.

* * * * *